Patented July 2, 1935

2,006,720

UNITED STATES PATENT OFFICE 2,006,720

FLUID PASTE OF ANTHRAQUINONE COMPOUNDS

Donald G. Rogers, Hamburg, N. Y., assignor to National Aniline and Chemical Company, Inc., New York, N. Y., a corporation of New York No Drawing. Application July 19, 1930, Serial No. 469,259

26 Claims. (Cl. 8—6)

This invention relates to fluid pastes of anthraquinone compounds, and more particularly to highly concentrated aqueous fluid pastes of anthraquinone compounds (that is, suspensions of the anthraquinone compounds in water which have high concentrations of the anthraquinone compound), and to processes of producing the same. The invention also relates to highly concentrated filter-cakes and equivalent masses of anthraquinone compounds and processes of producing them.

In the manufacture of metal-free anthraquinone compounds, both dyestuffs and intermediates, the compound is often produced in the form of a precipitate in suspension in a mother liquor from which it is separated by filtration, and the resulting filter-cake is washed free from the mother liquor and agitated with water to disintegrate it and form a fluid suspension or so-called paste. When produced in this manner, the fluid paste has a concentration of organic compound of about 15 to 30 per cent. by weight.

These pastes have the evident disadvantage that they contain a very large proportion of an inert ingredient, water (usually 70 to 85 per cent. by weight), which adds greatly to the cost of containers and transportation, and, therefore, to the ultimate cost of the product to the consumer, on the basis of content of active material.

Various proposals have been advanced having for their object a reduction or elimination of the water content of the pastes, and the production of a powder or of a more concentrated paste. While in certain instances the results of such proposals have been satisfactory, in general the solution of the difficulty introduces factors which are themselves undesirable, and offset the benefits derived.

In the case of alizarine (1,2-dihydroxyanthraquinone), for example, which is generally produced as a 20 per cent. aqueous paste by filtering a suspension of alizarine in dilute acid, washing the filter-cake with water, blowing air through the filter-cake to remove water, and agitating the resulting filter-cake, which contains about 22 to 25 per cent. by weight of dyestuff, with the required amount of water to form the 20 per cent. fluid paste, it has been proposed to reduce the water content of the filter-cake by blowing air through it for a very long time. This, however, merely increases the strength of the filter-cake to about 28 per cent. by weight of dyestuff, which hardly compensates for the added cost of the extended aeration. It also has been proposed to mix the paste with starch, tripolite, and the like insoluble thickening agents, and evaporate the mixture, whereby solid lumpy preparations are produced which can be redispersed with water for use, and which contain a high percentage of alizarine. But such preparations are not acceptable for the manufacture of certain products such as lakes, owing to the presence of the insoluble thickening agent in the suspension formed upon redispersion of the alizarine.

An object of the present invention is to produce fluid suspensions, or pastes, of water-insoluble anthraquinone compounds which contain more than 30 per cent. by weight of the anthraquinone compound, which are preferably non-drying, and which are relatively free from insoluble thickening agents.

Other objects of the invention are to provide a process whereby filter-cakes and equivalent masses of water-insoluble metal-free anthraquinone compounds may be produced which contain water and a greater amount of water-insoluble anthraquinone compound than the filter-cakes obtainable by filtration of a suspension of the anthraquinone compound in dilute acid, and to provide a process for the production of fluid aqueous suspensions having high concentration of the anthraquinone compound from said filter-cakes or masses.

Additional objects of the invention are to produce aqueous suspensions of water-insoluble anthraquinone dyestuffs which contain more than 40 per cent. by weight of the dyestuff, and are relatively free from insoluble thickening agents, and to provide a process for the production of such suspensions.

A further object of the invention is to provide a process for the production of a stable, thin, fluid, aqueous suspension of alizarine which contains more than 30 per cent. of alizarine by weight.

Other objects of the invention will in part be obvious and will in part appear hereinafter.

The invention accordingly comprises the new products as well as the several steps and the relation of one or more of such steps with respect to others thereof employed in the preparation of such products which will be exemplified in the products and process hereinafter disclosed. The scope of the invention will be indicated in the claims.

According to the present invention, compositions containing water-insoluble anthraquinone compounds may be prepared, which contain greater percentages by weight of the anthraquinone compounds than are ordinarily present in the filter-cakes resulting from the filtration of suspensions of the anthraquinone compounds in dilute acid, by agitating a liquid containing mass of a water-insoluble anthraquinone compound, resulting from the mechanical separation of a suspension of the anthraquinone compound in dilute acid, with water and preferably with a relatively small amount of a dispersing agent, to produce a suspension or slurry of the anthraquinone compound, and mechanically separating the suspended compound from the liquid. Furthermore, according to the present invention, thin, fluid, aqueous suspensions of the anthraquinone compounds may be prepared which also contain high concentrations of anthraquinone compounds by reslurrying the mass of separated compound, for example, by agitation of said mass of separated compound (with the further addition of a small amount of dispersing agent, if necessary). I have found that the product which results from the separation of the suspended compound from the liquid of the aqueous suspension contains the anthraquinone compound in a much higher concentration than the mass employed as the starting material; and also, that said product, when agitated (with the addition of a small amount of dispersing agent, if necessary), forms a thin, mobile, fluid suspension which also contains the anthraquinone compound in a relatively high concentration. I have found, furthermore, that the resulting thin, mobile, fluid suspension, containing the anthraquinone compound in a relatively high concentration, can be still further concentrated by a repetition of the separating and reslurrying operations.

Moreover, according to the present invention, relatively non-drying highly concentrated suspensions of anthraquinone compounds may be produced by incorporating a hygroscopic substance into said suspensions.

In addition, according to the present invention, aqueous suspensions of water-insoluble anthraquinone compounds are produced containing more than 30 per cent. by weight of the anthraquinone compound and a small amount of a protective colloid as a stabilizing agent. I have found that such aqueous suspensions of water-insoluble anthraquinone compounds may be permitted to stand for a considerable length of time without settling of the suspended material to a hard mass, and furthermore that any of the anthraquinone compound which settles may be readily again dispersed merely by stirring the mass.

In carrying out the process of the present invention, in accordance with a preferred method of procedure, a filter-cake of a water-insoluble anthraquinone compound, as for example, a filter-cake of an alizarine dyestuff obtained by the filtration of a suspension of the dyestuff in dilute acid followed by washing of the press-cake with water, may be subjected to stirring, preferably with the addition of an agent which is capable of thinning or dispersing the mass and reducing its viscosity (and, if necessary, with the addition of a small amount of water sufficient to render the mass agitable), and the resulting slurry may be filtered to remove the water and form a highly concentrated filter-cake. In order to form a concentrated, thin, fluid suspension, or paste, of the anthraquinone compound, the highly concentrated filter-cake may be reslurried by subjecting it to stirring, with the addition of a small amount of a deflocculating or dispersing agent, if necessary. A filter-cake having a still higher concentration of the anthraquinone compound may be obtained by a refiltration of the resulting suspension; and a correspondingly more concentrated suspension may be produced from the resulting filter-cake by a repetition of the reslurrying operation.

Among the agents which may be added to the filter-cake to aid in reducing the viscosity and in producing deflocculation or dispersion, alkaline materials, such as the caustic alkalis, ammonium hydroxide, etc., may be particularly mentioned. These may be employed alone or in conjunction with other deflocculating or dispersing agents, as for example, colloiding agents, such as alkyl-naphthalene sulfonic acids and related substances, formaldehyde condensation products of alkyl-naphthalene sulfonic acids and related substances, Turkey-red oil, saponin, soaps of the higher saturated or unsaturated fatty acids or resin acids, etc. Substances which are both alkaline materials and colloiding agents may also be employed to advantage; for example, diethanolamine, triethanolamine, technical mixtures of alkanol amines, etc.

The amount of dispersing or deflocculating agent employed should be sufficient to reduce the viscosity of the filter-cake to an extent such that it can be filtered, but so great an amount should not be used that excessive dispersion is obtained resulting in passage of the material through the filter without leaving a filter-cake. In general, the amount should be such that only a relatively small or minor portion of the dispersed anthraquinone compound, if any, passes into the filtrate, otherwise the yield of concentrated filter-cake and/or paste obtained is uneconomically decreased.

Any suitable alkaline material may be employed to reduce the viscosity of the filter-cake and render it more dispersible, as for example, sodium hydroxide, sodium carbonate, potassium hydroxide, potassium carbonate, borax, ammonium hydroxide, disodium phosphate, methyl amine, etc. An alkaline compound of an alkali metal or of ammonia is preferred, however. The alkaline material preferably may be employed in an amount sufficient to form a thin, fluid dispersion of the anthraquinone compound. A large excess of the alkaline material is preferably avoided, since it tends to cause settling out of the compound upon standing; a small excess may be used, however. In practice, amounts of alkali may be used as high as about 3 per cent. by weight of the anthraquinone compound in the filter-cake, depending upon the compound treated. When employing an alkaline compound, such as an alkali-metal hydroxide or ammonium hydroxide, with a dihydroxyanthraquinone compound, however, it is preferable that the amount employed be less than that required to produce an appreciable amount of the corresponding salt of the dihydroxyanthraquinone compound, which can be readily detected by colorimetric tests. In reslurrying a concentrated filter-cake, resulting from the filtration of a slurry produced with the aid of an alkaline material, for the production of a concentrated suspension or so-called paste, additional alkaline material frequently need not be added, inasmuch as the filter-cake disperses in some cases merely upon being stirred.

The employment of a colloiding agent in conjunction with an alkaline material is especially advantageous in those cases where the alkaline material by itself does not produce a satisfactory dispersion of the filter-cake, as for example, in the case of an anthraquinone paste obtained by filtering a suspension of anthraquinone in dilute sulfuric acid, and the amount of colloiding agent employed will vary depending upon the compound being treated and the other conditions of the treatment. Amounts varying from about one-fourth to about five per cent. of the weight of the anthraquinone compound in the filter-cake may be advantageously employed in practice, although the invention is not limited to such amounts.

The highly concentrated pastes or suspensions resulting from the process may settle to some extent upon standing for a considerable length of time, particularly when dispersion has been effected with the aid of an alkaline material alone. Such pastes or suspensions may be rendered comparatively non-settling by mixing with the paste a small amount of a protective colloid as a stabilizing agent; for example, 0.1 to 2 per cent. of the weight of the anthraquinone compound in the paste.

The stabilizing agent, which, when employed, may be incorporated at any suitable stage of the process (for example, during the formation of the paste or suspension, or after its formation), may be any suitable protective colloidal material; as for example, sulfite cellulose waste liquor, sulfonated castor oil, alkylnaphthalene sulfonic acids, alkylnaphthalene-formaldehyde-sulfuric acid condensation products, alkyl cellulose, aryl esters of phosphoric acid, benzylarylamine sulfonic acids, agar-agar, pectin, bentonite or other colloidal clay, glue, etc.

If desired, hygroscopic substances, particularly high-boiling, inert, organic liquid hygroscopic substances, also may be incorporated into the pastes or suspensions in order to increase their keeping qualities and prevent undue loss of moisture when the containers in which the products are stored by the consumer are left open to the atmosphere for long periods of time. Hygroscopic substances especially suitable for the purpose are, for example, diethylene glycol, glycerine, glycol, etc.

As illustrative embodiments of a manner in which the invention may be carried into practice, and of the products produced, the following examples are presented. The parts are by weight.

*Example 1.*—833 parts of an Alizarine NAC filter-cake (containing about 24 per cent. of dyestuff and obtained by filtering off alizarine from a suspension thereof in dilute sulfuric acid followed by washing the filter-cake with water until substantially free from acid) is agitated with about 165 parts of water and about 2 parts of 30 per cent. sodium hydroxide solution until a fluid suspension is obtained. The resulting suspension is filtered in a filter press of the ordinary plate and frame type containing the usual square or twill weave cotton filter cloth, and air is blown through the press-cake until substantially no more water can be removed. About 466 parts of a press-cake is obtained which contains about 42 per cent. by weight of dyestuff. The resulting press-cake is stirred, and if the lumps do not disintegrate and the mass does not become thin and mobile, sodium hydroxide solution is added at intervals in very small portions until the press-cake has substantially completely disintegrated and a thin, mobile, fluid paste has been formed. (This requires about ½ part of 30 per cent. aqueous sodium hydroxide solution in all, and agitation for about 6 to 8 hours). The resulting paste contains about 42 per cent. of alizarine by weight. It may be standardized to a 40 per cent. paste by the addition of 20 parts of water with agitation.

*Example 2.*—500 parts of an Alizarine NAC paste, containing 200 parts of dyestuff and prepared for example in the manner described in Example 1, is filtered on a filter press of the ordinary type, and the press-cake is blown with air. About 250 parts of a press-cake is obtained which contains about 70 per cent. by weight of dyestuff. By slurrying the resulting press-cake with about 20 parts of water and a small amount of alkali (about ¼ part of 30 per cent. aqueous sodium hydroxide) in the manner described in Example 1, a fluid paste is obtained containing about 65 per cent. by weight of dyestuff.

*Example 3.*—500 parts of a 40 per cent. Alizarine NAC paste prepared in the manner described in Example 1, is agitated with about 6 parts of a neutralized concentrated sulfite cellulose waste liquor. The resulting product is a thin, mobile, fluid paste, which contains about 40 per cent. of alizarine, which settles only to a small extent, if at all, even when left standing for a considerable length of time, and which, if settled, readily may be dispersed by stirring.

*Example 4.*—500 parts of a 42 per cent. press-cake of Alizarine NAC, prepared by the filtration of a dispersion of Alizarine NAC in water produced as described in Example 1, is washed on the filter-press with a diethyleneglycol-water mixture, containing 80 parts of diethyleneglycol per 20 parts of water, until the water in the press-cake has been replaced by the mixture. The resulting press-cake is then agitated with 24 parts of the diethyleneglycol-water mixture and about 1 part of ammonium hydroxide solution until a fluid paste is produced. The resulting paste, which contains about 40 per cent. of the dyestuff, when spread in a thin layer on a glass plate and exposed to the atmosphere for several weeks, shows no indication of drying; and when subsequently added to water with agitation, as in the preparation of a dye-bath, readily disperses throughout the bath.

It will be realized that the invention is not limited to the products or to the process and the details thereof which are set forth in the foregoing example. Thus, the process may be applied to the preparation of highly concentrated filter-cakes and/or pastes of other, preferably metal-free anthraquinone compounds, more particularly other hydroxyanthraquinones, and especially other dihydroxyanthraquinones and so-called "alizarine dyestuffs"; as for example, 1.2.4-trihydroxyanthraquinone, 1.2-dihydroxy-3-nitro-anthraquinone, 1.5-dihydroxyanthraquinone, 1.8-dihydroxyanthraquinone, 1.4-dihydroxyanthraquinone, 1.2.7-trihydroxyanthraquinone, 1.2.6-trihydroxyanthraquinone, 1.2.5.8-tetrahydroxyanthraquinone, indanthrone, flavanthrone, dibenzanthrone, chlorindanthrone, chlorquinizarine, etc.

The concentrated filter-cakes or equivalent masses produced in accordance with the invention may be employed for the production of products other than concentrated suspensions or pastes; for example, they may be dried by heating under vacuum to produce powders, etc.

The amount of water used in forming the slurry from the concentrated filter-cake or equivalent mass may vary over a wide range. The minimum amount being that required to form with a filter-cake or mass being treated a slurry which is capable of agitation. Frequently none need be added, as in Eaxmple 1.

It will be furthermore understood that instead of producing dispersion by stirring, as described, other forms of agitation may be employed; and that various types of filters, such as suction, pressure, centrifugal, and other types of filters, as well as various other methods of separating suspended solids from liquids, preferably mechanical, may be employed.

The expression "metal-free anthraquinone compound," as employed above and in the claims, denotes and includes the anthraquinone compounds which are free from metallic substituents; for example, alizarine, as distinguished from its calcium salt.

Since changes may be made in carrying out the above process and in the products and ingredients and proportions thereof without departing from the scope of the invention, it is intended that all matter contained in the above description shall be interpreted as illustrative and not in a limiting sense, except as limited by the claims.

I claim:

1. A composition of matter consisting of a liquid suspension of an anthraquinone compound, containing more than 30 per cent. by weight of said compound, a high-boiling, inert, organic liquid hygroscopic substance, and a small amonut of a colloiding agent in the form of a fluid paste which is relatively non-drying.

2. A composition of matter consisting of a liquid suspension of an anthraquinone compound, containing more than 30 per cent. by weight of said compound, and a small amount of a protective colloid as a stabilizing agent, in the form of a fluid paste.

3. A composition of matter consisting of a liquid suspension of a hydroxyanthraquinone compound, containing more than 30 per cent. by weight of said compound, a high-boiling, inert, organic liquid hygroscopic substance, and a small amount of a colloiding agent in the form of a fluid paste which is relatively non-drying and does not settle to any considerable extent on standing.

4. A composition of matter consisting of an aqueous suspension of a hydroxyanthraquinone compound, containing not less than 40 per cent. by weight of said compound, a high-boiling, inert, organic liquid hygroscopic substance, and a small amount of a colloiding agent, in the form of a fluid paste which is relatively non-drying.

5. A composition of matter consisting of an aqueous suspension of alizarine containing not less than 40 per cent. by weight of alizarine and a small amount of a colloiding agent, in the form of a fluid paste which does not settle to any considerable extent on standing.

6. A composition of matter consisting of an aqueous suspension of alizarine containing not less than 40 per cent. by weight of said alizarine, sulfite cellulose waste liquor in an amount not exceeding 2 per cent. of the weight of the alizarine, and diethylene glycol.

7. A process of preparing a concentrated suspension of an insoluble antraquinone compound from a less concentrated paste thereof from which liquid is not removable merely by filtration, which comprises agitating said paste without addition of liquid, to liberate liquid and form a fluid suspension of said compound, mechanically separating liquid from the fluid suspension, and agitating the resulting separated compound, to form a fluid suspension.

8. A process of preparing a concentrated suspension of an insoluble anthraquinone compound, which comprises agitating a liquid-containing mass of said compound with a small amount of an alkaline material and a small amount of a colloiding agent as dispersing agents, to form a thin, fluid suspension of said compound, mechanically separating liquid from the fluid suspension, to form a thick liquid-containing mass of said compound, and agitating the resulting thick mass to form a thin, fluid suspension.

9. A process of preparing a concentrated aqueous suspension of an anthraquinone compound from a filter-cake of said compound, obtained by filtering a suspension in dilute acid of said compound, which comprises stirring said filter-cake with a small amount of an alkaline material and a small amount of an alkylnaphthalene-formaldehyde-sulfuric acid condensation product as dispersing agents, to form a thin, fluid suspension of said compound, separating liquid from the suspension, to form a thick liquid-containing mass of said compound, and stirring the resulting thick mass with an additional small amount of dispersing agent, to form a thin, fluid suspension.

10. In a process of preparing a concentrated paste of an insoluble anthraquinone compound, the improvement which comprises agitating a liquid-containing mass of said compound in the form of a paste from which liquid is not removable merely by filtration, to liberate liquid and form a fluid suspension of said compound, and mechanically separating liquid from the fluid suspension.

11. In a process of preparing a concentrated suspension of an insoluble anthraquinone compound, the improvement which comprises agitating a liquid-containing mass of said compound with a dispersing agent capable of reducing the viscosity of said mass without substantially decreasing the concentration of said compound in said mass, to form a fluid suspension of said compound, and mechanically separating liquid from the fluid suspension.

12. A process of preparing a concentrated aqueous suspension of a hydroxyanthraquinone compound from a filter-cake of said compound, obtained by filtering an aqueous suspension of said compound, which comprises stirring said filter-cake, to liberate water and a fluid suspension of said compound, mechanically separating liberated water from the fluid suspension, and stirring the resulting mass of said compound, to form a fluid suspension.

13. A process of preparing a concentrated suspension of a hydroxyanthraquinone compound from a filter-cake of said compound containing water, which comprises stirring said filter-cake with a small amount of an alkaline material as a dispersing agent, to form a thin fluid suspension of said compound, separating the suspended compound containing water from the fluid suspension, to form a thick, liquid-containing mass, and stirring the resulting mass, to form a thin, fluid suspension.

14. A process of preparing a concentrated suspension of a hydroxyanthraquinone compound from a filter-cake of said compound, which comprises agitating said filter-cake with a small amount of a dispersing agent capable of reducing the viscosity of said filter-cake, to form a fluid suspension of said compound, mechanically separating liquid from the fluid suspension to form a thick liquid-containing mass, agitating the resulting mass with an additional small amount of dispersing agent, to form a thin, fluid suspension, and incorporating into said suspension a small amount of a protective colloid, as a stabilizing agent.

15. A process of preparing a concentrated aqueous suspension of a hydroxyanthraquinone compound from a filter-cake of said compound, obtained by filtering a suspension in dilute acid of said compound, which comprises stirring said filter-cake with a small amount of a dispersing agent capable of reducing the viscosity of said filter-cake without substantially decreasing the concentration of said compound in said filter-cake, to form a fluid suspension of said compound, mechanically separating water from the suspension to form a thick mass containing water, stirring the resulting mass with an additional small amount of dispersing agent, to form a thin, fluid suspension, and incorporating into said suspension a small amount of a protective colloid, as a stabilizing agent, and a hygroscopic substance.

16. A process of preparing a concentrated aqueous suspension of a dihydroxyanthraquinone from a filter-cake of said dihydroxyanthraquinone, which comprises stirring said filter-cake with a small amount of an alkaline material as a dispersing agent, to form a thin, fluid suspension of said dihydroxyanthraquinone, filtering off the dihydroxyanthraquinone, and stirring the resulting filter-cake with an additional small amount of dispersing agent, to form a thin, fluid suspension.

17. A process of preparing a concentrated aqueous suspension of a dihydroxyanthraquinone from a filter-cake of said dihydroxyanthraquinone, which comprises stirring said filter-cake with a small amount of an alkaline material as a dispersing agent, to form a thin, fluid suspension of said dihydroxyanthraquinone, filtering off the dihydroxyanthraquinone, stirring the resulting filter-cake with an additional small amount of alkali, as a dispersing agent, to form a thin, fluid suspension, and incorporating into said suspension a high-boiling, inert, organic liquid hygroscopic substance.

18. A process of preparing a concentrated aqueous suspension of alizarine from a filter-cake of alizarine, obtained by filtering a suspension in dilute acid of said alizarine, which comprises stirring said filter-cake with a small amount of an alkanol amine as a dispersing agent, to form a thin, fluid suspension of said alizarine, filtering off the alizarine, and stirring the resulting filter-cake with an additional small amount of alkanol amine as a dispersing agent, to form a thin, fluid suspension.

19. A process of preparing a concentrated aqueous suspension of alizarine from a filter-cake of alizarine, obtained by filtering a suspension in dilute acid of said alizarine, which comprises stirring said filter-cake with a small amount of ammonium hydroxide as a dispersing agent, to form a thin, fluid suspension of said alizarine, filtering off the alizarine, stirring the resulting filter-cake with an additional small amount of alkali as a dispersing agent, to form a thin, fluid suspension, and incorporating into said suspension a small amount of neutralized sulfite cellulose waste liquor, as a stabilizing agent.

20. A process of preparing a concentrated aqueous suspension of alizarine from a filter-cake of alizarine, obtained by filtering a suspension in dilute acid of said alizarine, which comprises stirring said filter-cake with a small amount of sodium hydroxide as a dispersing agent, to form a thin, fluid suspension of said alizarine, filtering off the alizarine, replacing a portion of the water in the filter-cake with diethyleneglycol, and stirring the resulting filter-cake with a small amount of sodium hydroxide as a dispersing agent, to form a thin, fluid, suspension which does not dry out on exposure to the atmosphere.

21. In a process of preparing a concentrated aqueous suspension of alizarine from a filter-cake of alizarine, obtained by filtering a suspension in dilute acid of said alizarine, the improvement which comprises stirring said filter-cake with a small amount of sodium hydroxide as a dispersing agent, to form a thin, fluid suspension of said alizarine, and filtering off the alizarine.

22. In a process of preparing a concentrated paste of an anthraquinone compound, the improvement which comprises incorporating a mass of said compound with a dispersing agent capable of reducing the viscosity thereof without substantially decreasing the concentration of said compound in said mass, to form a fluid suspension, and separating liquid from the resulting suspension.

23. In a process of preparing a concentrated aqueous suspension of a dihydroxyanthraquinone from a filter-cake of said dihydroxyanthraquinone, obtained by filtering an aqueous suspension of said compound, the improvement which comprises stirring said filter-cake with a small amount of an alkaline material as a dispersing agent, to form a thin, fluid suspension of said dihydroxyanthraquinone, and filtering off the dihydroxyanthraquinone.

24. An aqueous fluid paste of a dihydroxyanthraquinone containing about 40 to about 75 per cent. by weight of dihydroxyanthraquinone, approximately 60 to approximately 25 per cent. of water and not more than about 2 per cent. of a colloiding agent.

25. A composition of matter consisting of an aqueous suspension of alizarine containing not less than 40 per cent by weight of alizarine, diethylene glycol, and a colloiding agent in an amount not exceeding 2 per cent of the weight of alizarine.

26. A process of preparing a concentrated aqueous suspension of a dihydroxyanthraquinone from a filter-cake of said dihydroxyanthraquinone, which comprises agitating said filter-cake with a dispersing agent capable of reducing the viscosity of said filter-cake without substantially decreasing the concentration of said dihydroxyanthraquinone therein, to form a fluid suspension of said dihydroxyanthraquinone, filtering off the dihydroxyanthraquinone, and agitating the resulting filter-cake in the presence of said dispersing agent to form a fluid suspension.

DONALD G. ROGERS.

CERTIFICATE OF CORRECTION.

Patent No. 2,006,720.            July 2, 1935.

DONALD G. ROGERS.

It is hereby certified that error appears in the printed specification of the above numbered patent requiring correction as follows: Page 4, first column, line 70, claim 7, strike out the words and comma "resulting separated compound," and insert the words remaining mass; second column, line 46, claim 12, after "and" insert form; line 57, claim 13, before "separating" insert mechanically; and lines 57 and 58, same claim, strike out the words "the suspended compound containing"; and that the said Letters Patent should be read with these corrections therein that the same may conform to the record of the case in the Patent Office.

Signed and sealed this 20th day of August, A. D. 1935.

Leslie Frazer (Seal)            Acting Commissioner of Patents.